(12) United States Patent
An et al.

(10) Patent No.: US 9,292,888 B2
(45) Date of Patent: Mar. 22, 2016

(54) CONSTRUCTING AND CALIBRATING ENTHALPY BASED PREDICTIVE MODEL FOR BUILDING ENERGY CONSUMPTION

(71) Applicant: GLOBALFOUNDRIES INC., Grand Cayman (KY)

(72) Inventors: Lianjun An, Yorktown Heights, NY (US); Young T. Chae, Yorktown Heights, NY (US); Young Min Lee, Old Westbury, NY (US); Fei Liu, Scarsdale, NY (US); Rui Zhang, Ossining, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 108 days.

(21) Appl. No.: 13/930,536

(22) Filed: Jun. 28, 2013

(65) Prior Publication Data

US 2015/0006123 A1    Jan. 1, 2015

(51) Int. Cl.
| G06F 7/60 | (2006.01) |
| G06F 17/10 | (2006.01) |
| G06Q 50/06 | (2012.01) |
| G06Q 10/04 | (2012.01) |

(52) U.S. Cl.
CPC ............. *G06Q 50/06* (2013.01); *G06Q 10/04* (2013.01)

(58) Field of Classification Search
CPC ............ G06F 17/5018; G06F 17/5036; G06F 17/5009; G06F 2217/16; G05B 17/02
USPC ........................................................ 703/2, 5
See application file for complete search history.

(56) References Cited

U.S. PATENT DOCUMENTS

| 7,200,468 | B2 | 4/2007 | Ruhnke et al. | |
| 7,216,021 | B2* | 5/2007 | Matsubara et al. | ........... 700/295 |
| 8,078,330 | B2 | 12/2011 | Brickfield et al. | |
| 8,140,193 | B2 | 3/2012 | Lee | |
| 8,321,188 | B2 | 11/2012 | Johnson et al. | |
| 8,370,283 | B2 | 2/2013 | Pitcher et al. | |
| 8,495,886 | B2 | 7/2013 | Singh et al. | |
| 8,554,384 | B2 | 10/2013 | West et al. | |
| 2003/0061091 | A1 | 3/2003 | Amaratunga et al. | |
| 2004/0102937 | A1 | 5/2004 | Ibrahim | |

(Continued)

OTHER PUBLICATIONS

Kissock, J. K., et al., "Inverse Model Toolkit: Numerical Algorithms", ASHRAE Transaction, VBDD (Variable Base Degree Day) model with Static Data, Jun. 29, 2003, pp. 425-434, vol. 109, Part 2, Published by: Amer. Soc. Heating, Ref. Air-Conditoning Eng. Inc., Conference: ASHRAE Transactions Technical and Symposium Papers, Kansas City, MO.
IBM Inventors; Ttl: Forecasting Energy Consumption of Buildings with Effective Heat Capacities of Heating and Cooling; Aug. 11, 2009, Database: ip.com; ip.com No. IPCOM000186154D, p. 1.

(Continued)

*Primary Examiner* — Saif Alhija
(74) *Attorney, Agent, or Firm* — Scully, Scott, Murphy & Presser, P.C.

(57) ABSTRACT

A predictive model for building energy consumption may be constructed and run to predict energy consumption in a building or to detect anomaly in energy consumption in a building or combinations thereof. Historic energy consumption data associated with energy consumed in a building may be received. Enthalpy of air outside the building may be determined. An energy consumption model may be calibrated based on the historic energy consumption data and the enthalpy of air outside the building. The energy consumption model incorporates enthalpy difference between a balance enthalpy and the enthalpy of air outside the building.

8 Claims, 5 Drawing Sheets

(56) References Cited

U.S. PATENT DOCUMENTS

| | | |
|---|---|---|
| 2012/0084063 A1 | 4/2012 | Drees et al. |
| 2012/0150707 A1 | 6/2012 | Campbell et al. |
| 2012/0278051 A1 | 11/2012 | Jiang et al. |
| 2012/0330626 A1 | 12/2012 | An et al. |
| 2013/0035794 A1 | 2/2013 | Imani |

OTHER PUBLICATIONS

Korolija et al., Regression models for predicting UK office building energy consumption from heating and cooling demands, Energy and Buildings (Energy Build.), 2013, Publisher: Elsevier Ltd., Country of Publication: UK, ISSN: 0378-7788, Database: Ei Compendex (R), pp. 214-227, accepted Dec. 12, 2012.

* cited by examiner

CONSTRUCTING AND CALIBRATING ENTHALPY BASED PREDICTIVE MODEL FOR BUILDING ENERGY CONSUMPTION

FIELD

The present application relates generally to building energy, and more particularly to constructing and calibrating enthalpy based predictive model for building energy consumption.

BACKGROUND

Buildings consume energy. Different buildings consume different amounts of energy. In the present disclosure, a model is developed that may be calibrated for each of different buildings, to accurately predict energy usage in those buildings.

BRIEF SUMMARY

A method of constructing a predictive model for building energy consumption, in one aspect, may comprise receiving historic energy consumption data associated with energy consumed in a building. The method may also comprise determining enthalpy of air outside the building. The method may further comprise calibrating an energy consumption model that predicts the building energy consumption, the energy consumption model incorporating enthalpy difference between a balance enthalpy and the enthalpy of air outside the building, the calibrating performed based on the historic energy consumption data and the enthalpy of air outside the building.

A system for constructing a predictive model for building energy consumption, in one aspect, may comprise a module operable to execute on a processor and further operable to receive historic energy consumption data associated with energy consumed in a building. The module may be further operable to determine enthalpy of air outside the building. The module may be further operable to calibrate an energy consumption model based on the historic energy consumption data and the enthalpy of air outside the building. The energy consumption model may incorporate enthalpy difference between a balance enthalpy and the enthalpy of air outside the building. The calibrated energy consumption model may be operable to predict future energy consumption associated with the building based on forecasted weather data, and may be further operable to detect anomaly in energy usage in the building.

A computer readable storage medium or a device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
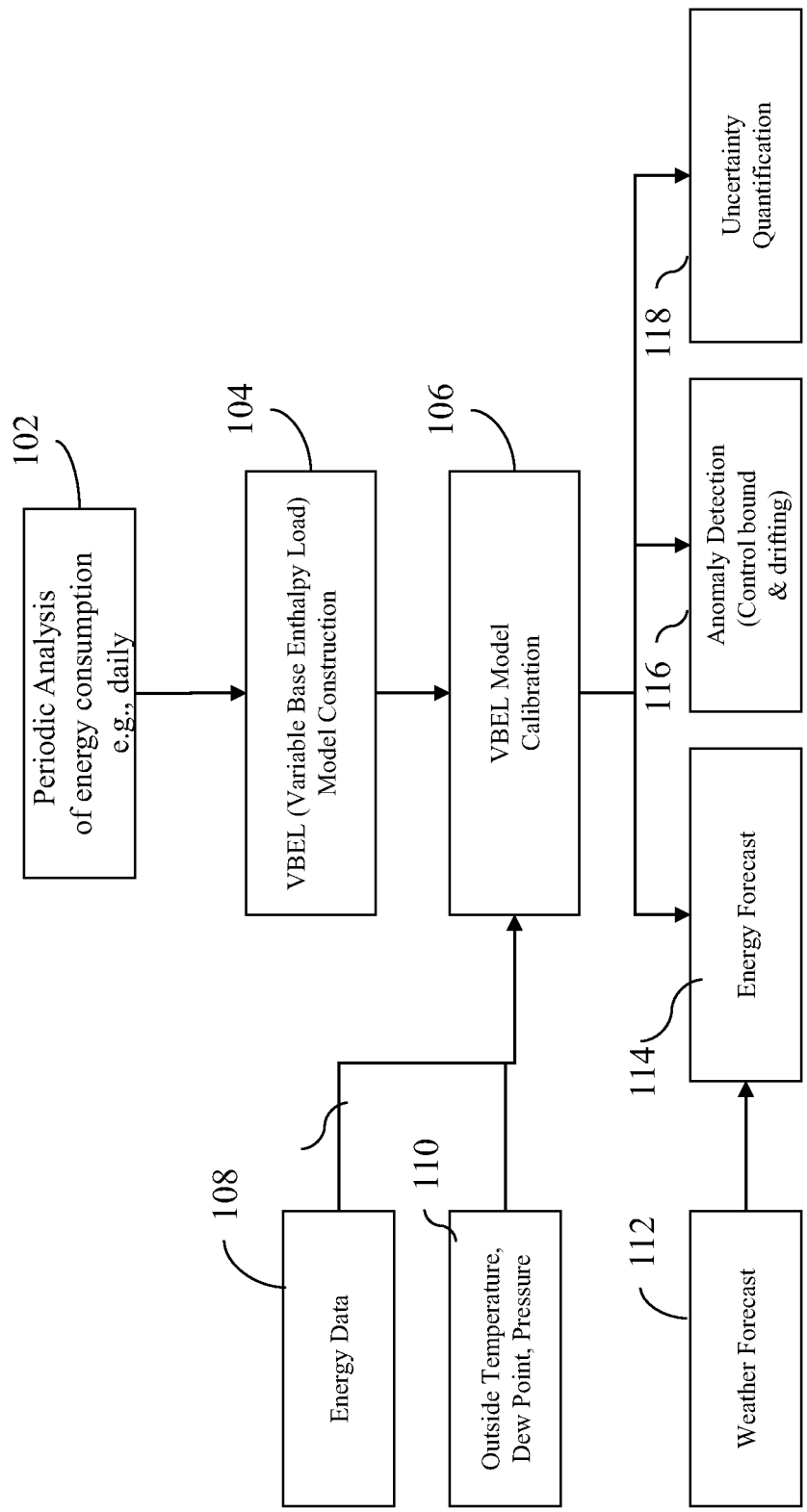
FIG. 1 is a flow diagram illustrating a method of the present disclosure in one embodiment.

Energy consumption prediction in a building has many benefits. For example, forecasted energy consumption information can be used to distribute the energy load in different ways so that the peak energy consumption is reduced or shifted to a different time. Energy pricing structure can be also planned effectively based on the prediction. In addition, predicted energy consumption can be compared with actual measured energy consumption to detect any anomaly, e.g., out of control bound and drifting trends, of energy consumption.

A building, generally, is a construction or a structure that may have a roof, walls and windows that at least partially encloses an area, and may have more than one level. Examples of buildings include but are not limited to houses, office buildings, school buildings, and others. Buildings such as commercial buildings currently have a number of meters and sub-meters that measure energy consumption in various zones of a building and for various equipment (chillers, boilers, pumps, air handling unit (AHU), lighting, plug load, etc.). High resolution meter data (e.g., by 1-minute, 15-minutes, etc.) are also available through a BMS (Building Management System).

Building energy consumption is highly correlated with heating energy load and cooling energy load. Therefore, a regression model that correlates energy consumption with heating load, cooling load and other weather independent load (base load) is useful in predicting energy consumption for a building in various situations.

The energy required for heating or cooling is influenced by moisture contents and latent heat (e.g., heat vaporization and condensation). Thus, heating energy load and cooling energy load can be more accurately estimated based on the enthalpy difference between the outside air and a balance (reference) enthalpy. Balance enthalpy refers to enthalpy of outside air below or above which energy consumption for heating (below the balance enthalpy) or for cooling (above the balance enthalpy) occurs in a building. There may be a balance enthalpy for heating and a balance enthalpy for cooling, e.g., associated with a building, an area of a building, or an area of a building controlled by a meter.

In the present disclosure in one embodiment, a method is presented for constructing an energy consumption prediction model that predicts energy consumption in a building. The energy consumption prediction model may take a form of a regression model with enthalpy load and calibrated with historic energy consumption data and weather data. The resulting model may be used for forecasting future energy consumption and for detecting anomaly of energy consumption in the building, e.g., control bound anomaly and drifting anomaly. The method may be used to construct energy consumption prediction models for different buildings.

Generally, a building may need to be heated or cooled on a continual or continuous basis to maintain a given level of occupant comfort, e.g., because of the heat transfer conduction that occurs over time through the building's envelope (e.g., the wall, window, roof); infiltration, and ventilation air entering into the room with certain temperature and moisture content; and because of the heat generated inside the building by internally located entities such as people, lighting and equipments, that might change the temperature and moisture inside the building.

Air is a mixture of dry air and water vapor. In atmospheric air, water vapor content varies from 0~3% by mass. The enthalpy of moist and humid air includes: enthalpy of the dry air—the sensible heat; and enthalpy of the evaporated water—the latent heat.

The latent content incorporated in the model of the present disclosure may accurately predict cooling and/or heating requirement (load). Enthalpy difference between weather condition and a base enthalpy value captures both the sensible load and latent load.

A building energy consumption model is shown in equation (1) below, as a regression model with heating load, cooling load and base load in one embodiment of the present disclosure. The model comprises an enthalpy load model (EL model), e.g., HED (heating enthalpy day) which models a monthly sum of daily heating enthalpy day, and a CED (cooling enthalpy day) which models a monthly sum of daily cooling enthalpy day. The enthalpy load model may be expressed in different period terms, e.g., heating or cooling enthalpy hour (HEH or CEH), heating or cooling enthalpy minute (HEM or CEM), etc. In a variable base enthalpy load (VBEL) model shown in equation (1), in one embodiment of the present disclosure, $h_{h,bal}$ (balance enthalpy for heating) is determined optimally, and $h_{c,bal}$ (balance enthalpy for cooling) is determined optimally.

$$E_{ij} = b_j + h_j \cdot HEL_{ij}(h_{h,bal,j}) + c_j \cdot CEL_{ij}(h_{c,bal,j}) + \varepsilon_{ij} \quad (1)$$

$$HEL_{ij}(h_{h,bal,j}) = \sum_{k=1}^{N_j} \max(h_{h,bal,j} - h_k, 0),$$

$$CEL_{ij}(h_{c,bal,j}) = \sum_{k=1}^{N_j} \max(h_k - h_{c,bal,j}, 0),$$

wherein,
i=time period (e.g., a day);
j=a meter (sensor);
k=meter reading intervals (e.g., 15 minutes, wherein k may be a number of consecutive 15 minute intervals);
$N_j$=number of meter readings in j;
$E_{ij}$=energy consumption recorded by meter j in time period i;
$b_j$=coefficient for base enthalpy load for meter j;
$h_j$=coefficient for heating enthalpy load for meter j;
$c_j$=coefficient for cooling enthalpy load for meter j;
$h_{h,bal,j}$=balance enthalpy for heating associated meter j;
$h_{c,bal,j}$=balance enthalpy for cooling associated meter j;
$h_k$=enthalpy of the outside air at time interval k.
$\varepsilon_{ij}$=prediction error in energy consumption.

In the above equation, k is less than i.

In one embodiment of the present disclosure, enthalpy (e.g., $h_k$) is computed from weather data:
Outdoor dry bulb temperature $T_{db}$;
Outdoor dew point temperature $T_{dew}$; and
Atmospheric pressure P.

The following describes an enthalpy calculation that may be used in one embodiment of the present disclosure.

Saturation pressure $P_w$ over ice for the temperature range of −100 to 0 degrees Celsius is given by:

$$lnP_W = C_1/T_{dew} + C_2 + C_3 T_{dew} + C_4 T_{dew}^2 + C_5 T_{dew}^3 + C_6 T_{dew}^4 + C_7 lnT_{dew}$$

Saturation pressure $P_w$ over liquid water for the temperature range of 0 to 200 degrees Celsius is given by:

$$lnP_W = C_8/T_{dew} + C_9 + C_{10} T_{dew} + C_{11} T_{dew}^2 + C_{12} T_{dew}^3 + C_{13} lnT_{dew}$$

where, $C_1 = -0.56745359$ $C_2 = 6.3925247$ $C_3 = -9.677843e-03$ $C_4 = 6.2215701e-07$ $C_5 = 2.0747825e-09$ $C_6 = 9.4840240e-13$ $C_7 = 4.1635019$ $C_8 = 5.8002206e+03$ $C_9 = 1.3914993$ $C_{10} = -4.8640239e-02$ $C_{11} = 4.1764768e-05$ $C_{12} = -1.4452093e-08$ $C_{13} = 6.5459673$ Humidity ratio W is given by:

$$W = 0.62198 \frac{P_W}{P - P_W}$$

Enthalpy of the moist air h is given by:

$$h = 1.006 T_{db} + W(2501 + 1.805 T_{db})$$

In one embodiment of the present disclosure, fitting the variable base enthalpy load model (VBEL) is considered as a constrained optimization problem due to the non-negative constrain on the coefficients. In the present disclosure in one embodiment, a two step analysis is presented for uncertainty quantification. A model selection procedure is first performed, which selects the correct model. Then an inference is drawn based on the selected model. In the first step of the analysis, a model selection procedure may be performed as follows. Depending on whether one or more of $b_j$, $c_j$, $h_j$ are zeroes, the model space may include the following eight different models:

$E_{ij} = \varepsilon_{ij}$ $E_{ij} = b_j + \varepsilon_{ij}$ $E_{ij} = h_j \cdot HEL_{ij}(h_{h,bal,j}) + \varepsilon_{ij}$ $E_{ij} = c_j \cdot CEL_{ij}(h_{c,bal,j}) + \varepsilon_{ij}$ $E_{ij} + b_j + h_j \cdot HEL_{ij}(h_{h,bal,j}) + \varepsilon_{ij}$ $$E_{ij}=b_j+c_j\cdot\text{CEL}_{ij}(h_{c,bal,j})+\epsilon_{ij}$$

$$E_{ij}=h_j\cdot\text{HEL}_{ij}(h_{b,bal,j})+c_j\cdot\text{CEL}_{ij}(h_{c,bal,j})+\epsilon_{ij}$$

$$E_{ij}=b_j+h_j\cdot\text{HEL}_{ij}(h_{h,bal,j})+c_j\cdot\text{CEL}_{ij}(h_{c,bal,j})+\epsilon_{ij}$$

All the eight models may be tried, and the one with the smallest residual sum of squares among the models whose coefficient estimates are all non-negative may be selected. Given the selected model, in the second step, the uncertainty quantification for regression coefficients and forecast energy follows the standard ordinary least squares method. Letting p be the number of parameters of the selected model, $\hat{\mu}_i$ be the fitted value at time i, and $SE_i$ be the corresponding standard error of the prediction, $t_{1-\alpha/2,n-p}$ be the $1-\alpha/2$ percentile of a student t distribution with degree of freedom n–p, the uncertainty of the forecast energy can be quantified by the $1-\alpha$ level prediction interval (α may be user specified, e.g., 0.05): $(\hat{\mu}-t_{1-\alpha/2,n-p}SE_i, t_{1-\alpha/2,n-p}SE_i)$.

FIG. 1 is a flow diagram illustrating a method of the present disclosure in one embodiment. At 102, a periodic analysis of energy consumption takes place, e.g., daily. At 104, a variable base enthalpy load (VBEL) model is constructed as an energy consumption model. The model computes energy consumption at least as a sum of a base enthalpy load over a time period, heating enthalpy load over the time period, and cooling enthalpy load over the time period. A load refers to usage or requirement. The model, for example, has a mathematical form shown in equation (1).

At 106, the constructed energy consumption model is calibrated based on energy data 108 and the outside temperature, dew point, and pressure measurement data 110. For example, the energy data 108 may comprise historic energy consumption data associated with a building. The data at 110 may comprise historic weather data outside the building. Those data may be received or retrieved from a database. Enthalpy of air outside the building may be determined based on this historic weather data. Then energy consumption model may be calibrated based on the historic energy consumption data and the enthalpy of air outside the building.

For example, energy data 108 may provide $E_{ij}$ in equation (1), e.g., data measuring energy consumption of a building. The outside temperature, dew point, and pressure measurement data 110 may be used to compute enthalpy of air outside the building, $h_k$, as described above. Using those known $E_{ij}$ and $h_k$ values, $b_j$, $h_j$, $c_j$, $\text{HEL}_{ij}(h_{h,bal,j})$ and $\text{CEL}_{ij}(h_{c,bal,j})$ values may be determined.

At 114, the calibrated VBEL model may be used with weather forecast data 112 at future time, to predict energy consumption in a building at that future time. For instance, the weather forecast data 112 may be used to compute enthalpy (e.g., $h_k$) forecast. Using the calibrated model with the computed enthalpy forecast value, energy consumption (e.g., $E_{,ij}$) corresponding to that future time can be computed.

At 116, anomaly may be detected. Anomaly detection may comprise control bound or drifting or a combination of both control bound and drifting. For example, let $\hat{E}_{ij}$ represent energy consumption predicted by the VBEL model of the present disclosure over a period of time. Let $E_{ij}$ represent actual energy consumption measured over the same period of time. In control bound anomaly detection, an upper control bound (UCL) and a lower control bound (LCL) may be computed for example, with 95% confidence interval (2 standard deviation). Equation (2), for instance, may be used to compute the control bounds.

$$\hat{z}_i=(E_{ij}-\hat{E}_{ij})/\hat{\sigma} \qquad (2)$$

where $\hat{z}_i$ represents standardized residual.

Figure 2:
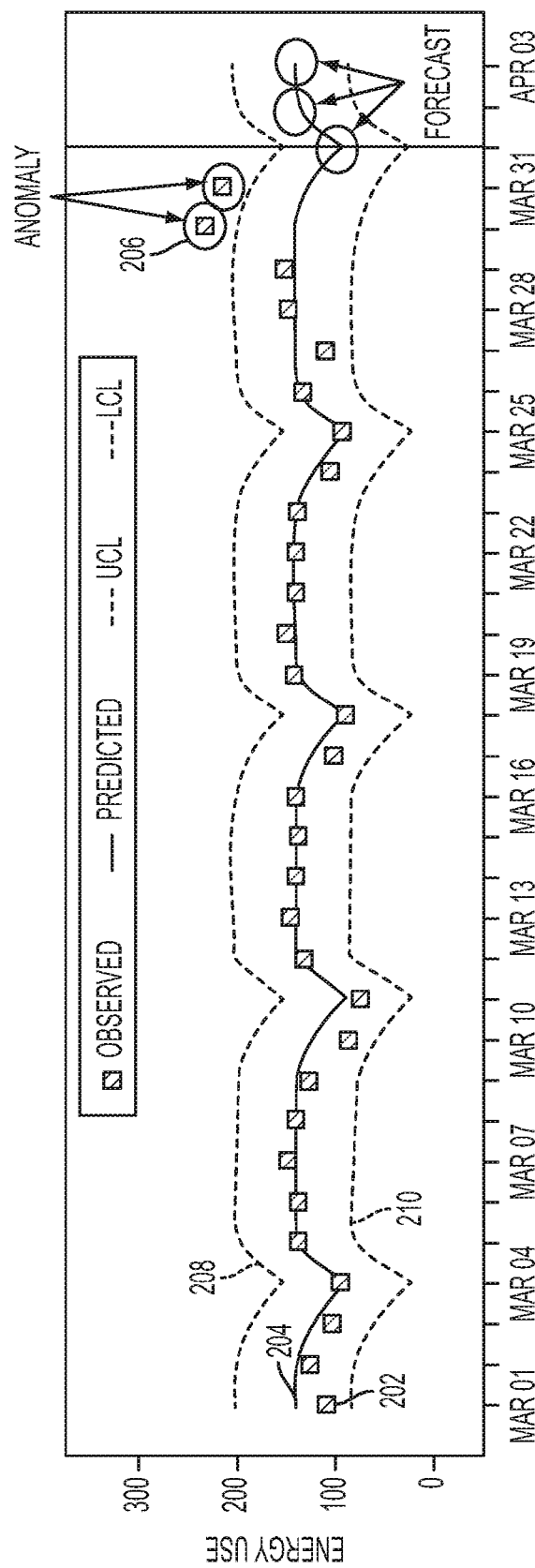
FIG. 2 is a diagram showing the anomaly detected using a control bound methodology in one embodiment of the present disclosure.

FIG. 2 is a diagram showing the anomaly detected using a control bound methodology in one embodiment of the present disclosure. In this figure, the actual measurements (shown as solid squares) 202 are consistent with the forecast or predicted data (shown in solid line) 204 until the data shown at 206. Upper control bound 208 and lower control bound 210 are also shown. The data 206 that is outside the control bounds is detected as anomalous data, e.g., warranting an alert, e.g., for an action to be taken.

Anomaly may be also detected by cumulative sum of difference (CUSUM) method. In this method, lower CUSUM may be computed as $C_{ij}^-=\max(0,(\hat{E}_{ij}-k)-E_{ij}+C_{i,j-1}^-)$, and upper CUSUM may be computed as $C_{ij}^+=\max(0,E_{ij}-(\hat{E}_{ij}+k)+C_{i,j-1}^+)$. A user may specify a drifting level, k. Alert for detected drifting may be generated if the lower CUSUM or the upper CUSUM reaches an alert level H. H may be a parameter specified by a user.

Figure 3:
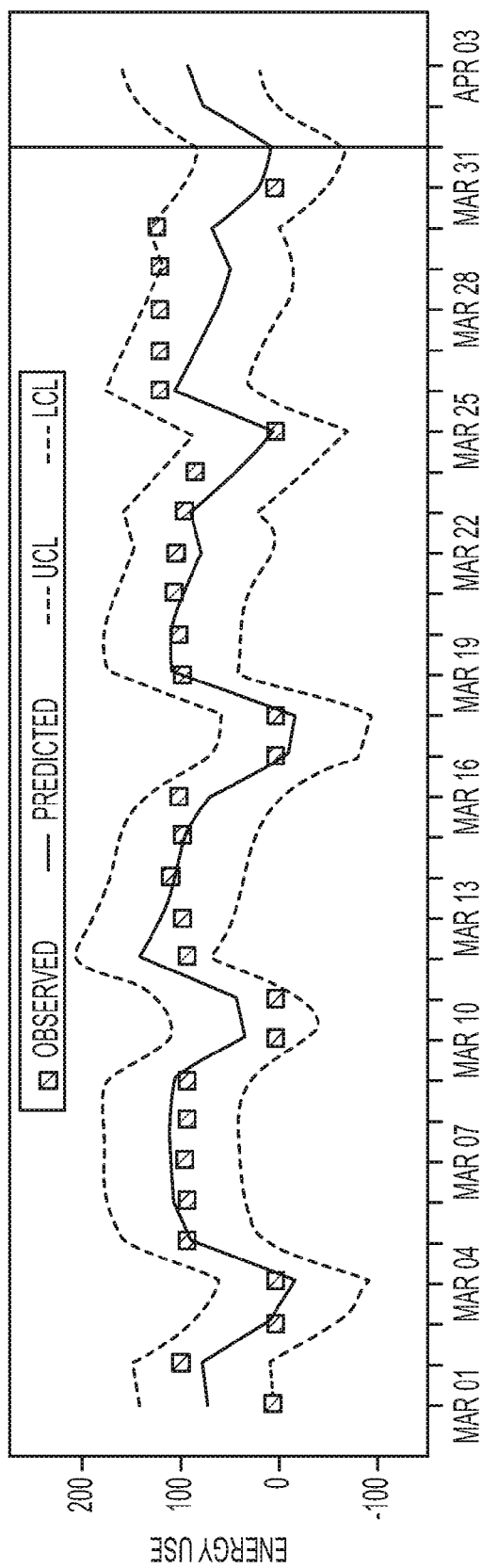
FIG. 3 is a diagram that illustrates a drifting condition that occurs in actual measurement data, in which the drifting data may be within or outside the upper control bound.
Figure 4:
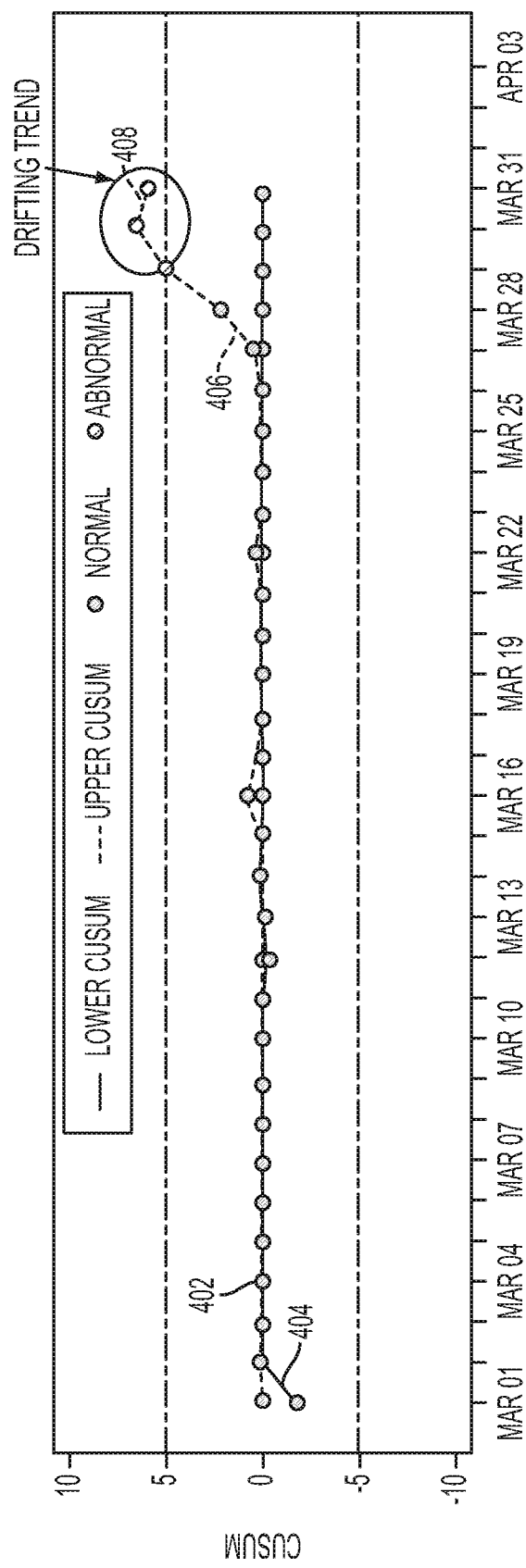
FIG. 4 shows an example drifting trend detected using a CUSUM method.

FIG. 3 is a diagram that illustrates a drifting condition that occurs in actual measurement data, in which the drifting data may be within or outside the upper control bound. FIG. 4 shows the same measurement data, in which the drifting trend is detected using the CUSUM method described above. The solid circles 402 represent data that is determined to be normal, the solid circles at 408 represent abnormal data, e.g., that produces a drifting trend. Lower CUSUM is shown by solid line 404. Upper CUSUM is shown in solid line 406.

Alerts may be triggered based on the detection of anomaly, for example, for further investigation and/or a corrective action such as checking the working conditions of building equipments (e.g., boilers, chillers and air handling units), replacing one or more building equipments, and others.

At 118, uncertainty quantification may be performed.

In one aspect, a user interface (e.g., a graphical user interface) may be provided that allows a user to interact with software or like tool that performs the methods described above, for example, according to FIG. 1. The user may input data, invoke energy consumption prediction module, e.g., to forecast or predict energy consumption of a building and detect anomaly in energy consumption in the building.

The energy consumption model of the present disclosure in one embodiment may apply to an entire building, one or more zones or areas of a building, or an area associated with a particular meter (e.g., an area or zone in a building whose energy consumption is measured by a particular meter).

Figure 5:
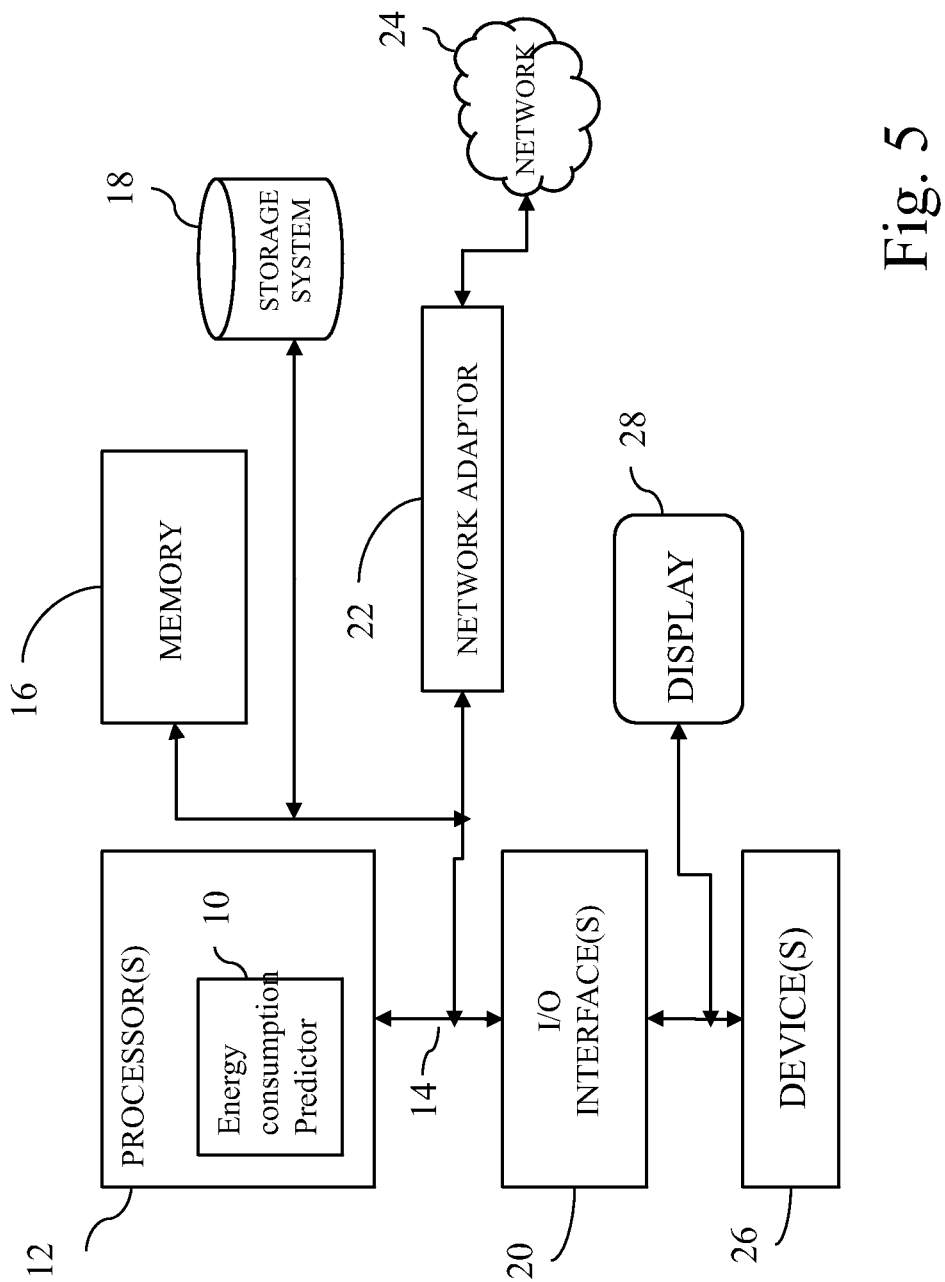
FIG. 5 illustrates a schematic of an example computer or processing system that may implement the energy consumption predictor system in one embodiment of the present disclosure.

FIG. 5 illustrates a schematic of an example computer or processing system that may implement the energy consumption predictor system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an energy consumption predictor module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of constructing a predictive model for building energy consumption, comprising:
   receiving historic energy consumption data associated with energy consumed in a building;
   determining enthalpy of air outside the building; and
   calibrating, by a processor, an energy consumption model that predicts the building energy consumption, the energy consumption model incorporating enthalpy difference between a balance enthalpy and the enthalpy of air outside the building, the calibrating performed based on the historic energy consumption data and the enthalpy of air outside the building, wherein the energy consumption model implements energy consumption measured per time period per sensor in the building in terms of a base enthalpy load over the time period, heating enthalpy load over the time period and cooling enthalpy load over the time period, the heating enthalpy load over the time period determined as a sum over a number of time intervals during the time period, of maximum of a zero value and a difference between the balance enthalpy associated with the sensor and an enthalpy of outside air at a respective time interval, the cooling enthalpy load over the time period determined as a sum, over the number of time intervals during the time period, of maximum of a a zero value and a difference between the enthalpy of outside air at the respective time interval and the balance enthalpy associated with the sensor, wherein the calibrating determines at least a first factor associated with the base enthalpy load over the time period, a second factor associated with the heating enthalpy load over the time period and a third factor associated with the cooling enthalpy load over the time period, the method further comprising providing a user interface allowing a user to interact with the processor to execute the predictive model and to present on a display device a graph display of one or more predicted results of the building energy consumption.

2. The method of claim 1, wherein the determining enthalpy of air outside the building comprises receiving historic weather data, and computing the enthalpy of air outside the building based on the historic weather data.

3. The method of claim 1, wherein the calibrating determines values associated with balance enthalpy for heating, balance enthalpy for cooling, coefficient for base enthalpy, coefficient for heating enthalpy, coefficient for cooling enthalpy terms incorporated in the energy consumption model.

4. The method of claim 1, wherein the energy consumption model is calibrated for different buildings using historic energy consumption data and historic weather data respectively associated with the different buildings.

5. The method of claim 1, wherein the energy consumption model is run to predict energy consumption associated with the building in a future time, based on forecasted weather of the future time.

6. The method of claim 1, wherein the energy consumption model is run to detect anomaly in energy consumption associated with the building.

7. The method of claim 6, wherein the anomaly is detected by one or more of:
identifying energy consumption outside of a control bound; or
identifying drifting trend of energy consumption by cumulative sum of difference analysis; or
combinations thereof.

8. A method of constructing a predictive model for building energy consumption, comprising:
receiving historic energy consumption data associated with energy consumed in a building;
determining enthalpy of air outside the building; and
calibrating, by a processor, an energy consumption model that predicts the building energy consumption, the energy consumption model incorporating enthalpy difference between a balance enthalpy and the enthalpy of air outside the building, the calibrating performed based on the historic energy consumption data and the enthalpy of air outside the building,
wherein the energy consumption model comprises an enthalpy based regression model in a mathematical form of $$E_{ij} = b_j + h_j \cdot HEL_{ij}(h_{h,bal,j}) + c_j \cdot CEL_{ij}(h_{c,bal,j}) + \varepsilon_{ij}$$

$$HEL_{ij}(h_{h,bal,j}) = \sum_{k=1}^{N_j} \max(h_{h,bal,j} - h_k, 0),$$

$$CEL_{ij}(h_{c,bal,j}) = \sum_{k=1}^{N_j} \max(h_k - h_{c,bal,j}, 0),$$

wherein,
i=time period;
j=a meter;
k=meter reading interval;
$N_j$=number of meter readings in j;
$E_{ij}$=energy consumption recorded by meter j in time period i;
$b_j$=coefficient for base enthalpy load for meter j;
$h_j$=coefficient for heating enthalpy load for meter j;
$c_j$=coefficient for cooling enthalpy load for meter j;
$h_{h,bal,j}$=balance enthalpy for heating associated with meter j;
$h_{c,bal,j}$=balance enthalpy for cooling associated with meter j;
$h_k$=enthalpy of the outside air at time interval k;
$\varepsilon_{ij}$=prediction error.

* * * * *